Nov. 11, 1924.   1,515,376
H. E. WHITE
CONTROL SYSTEM FOR VENTILATING SASH UNITS
Filed Aug. 15, 1921    14 Sheets-Sheet 1
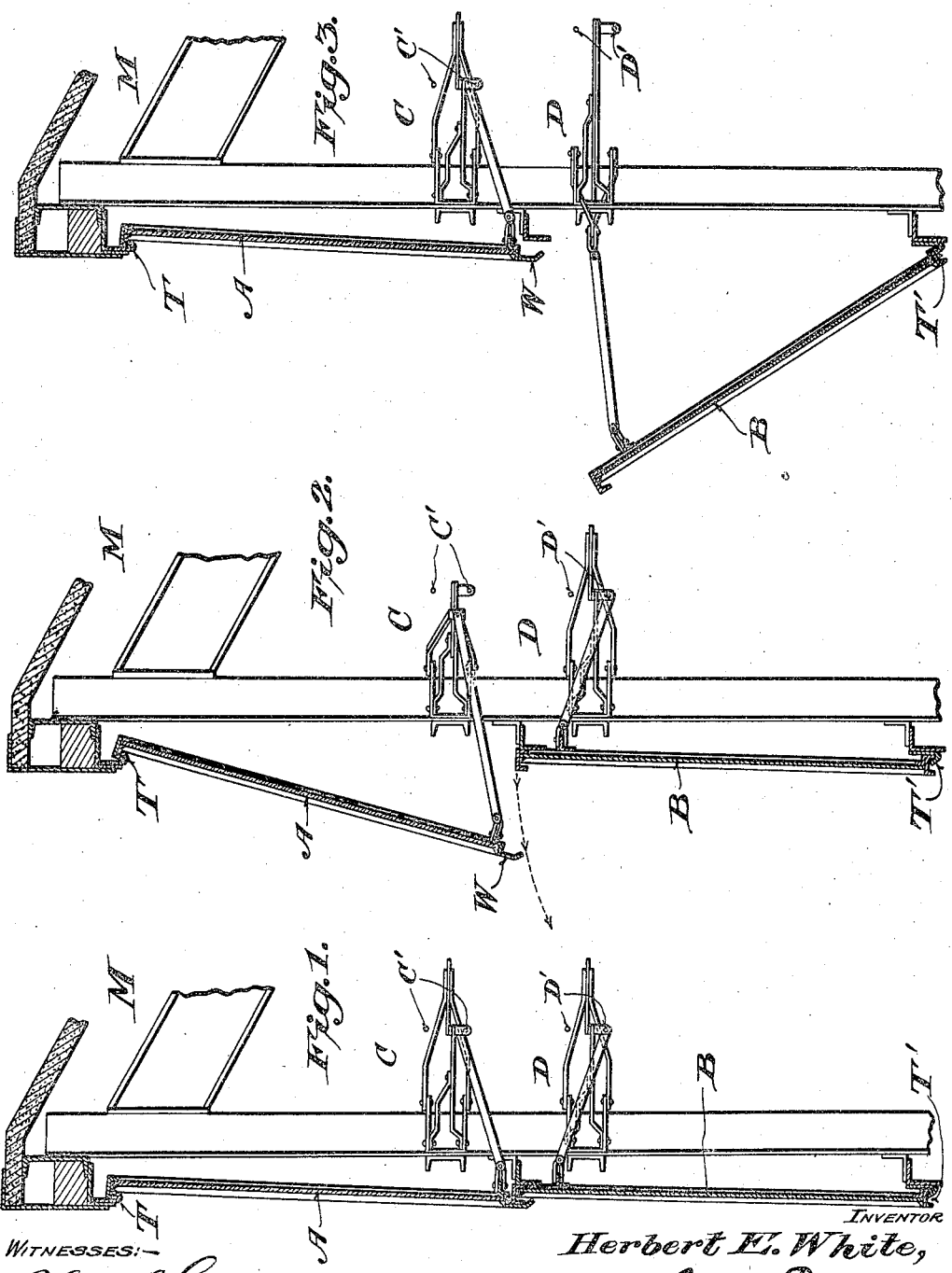

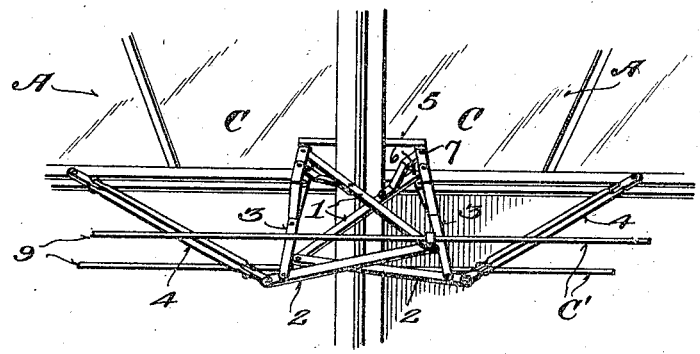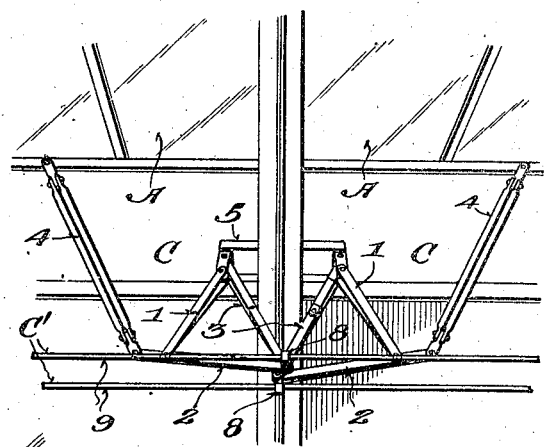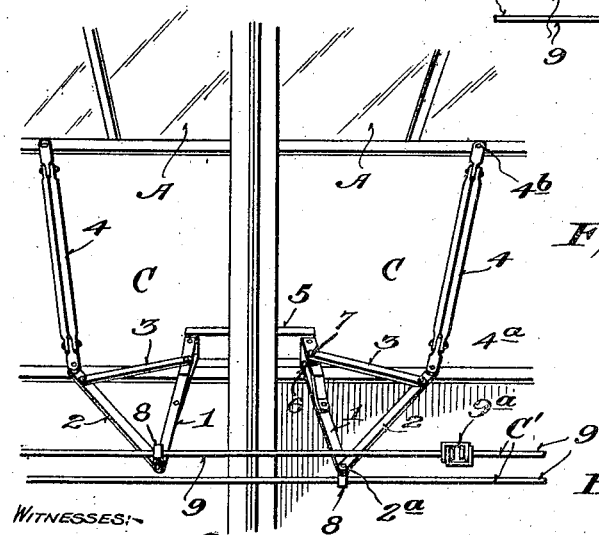

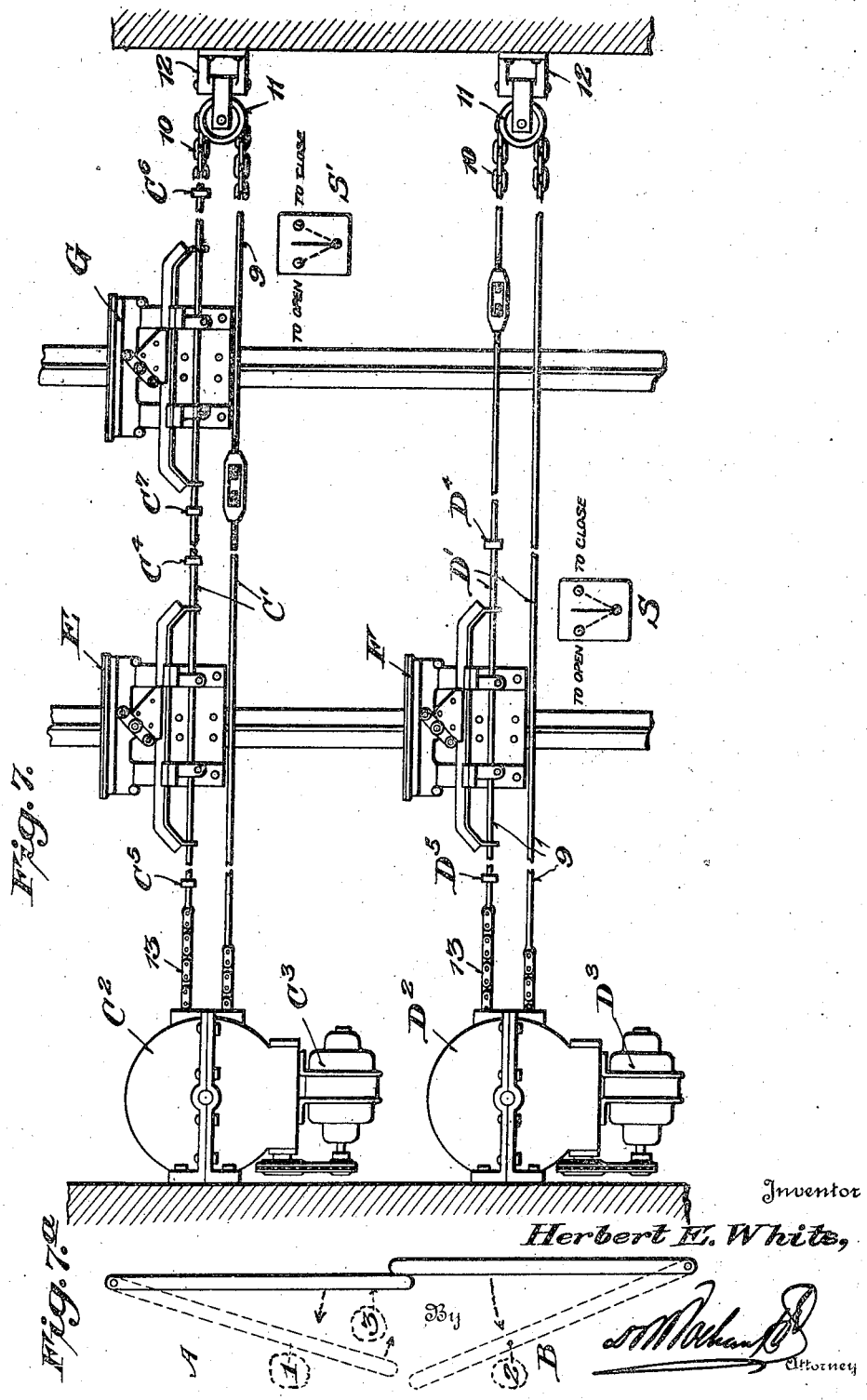

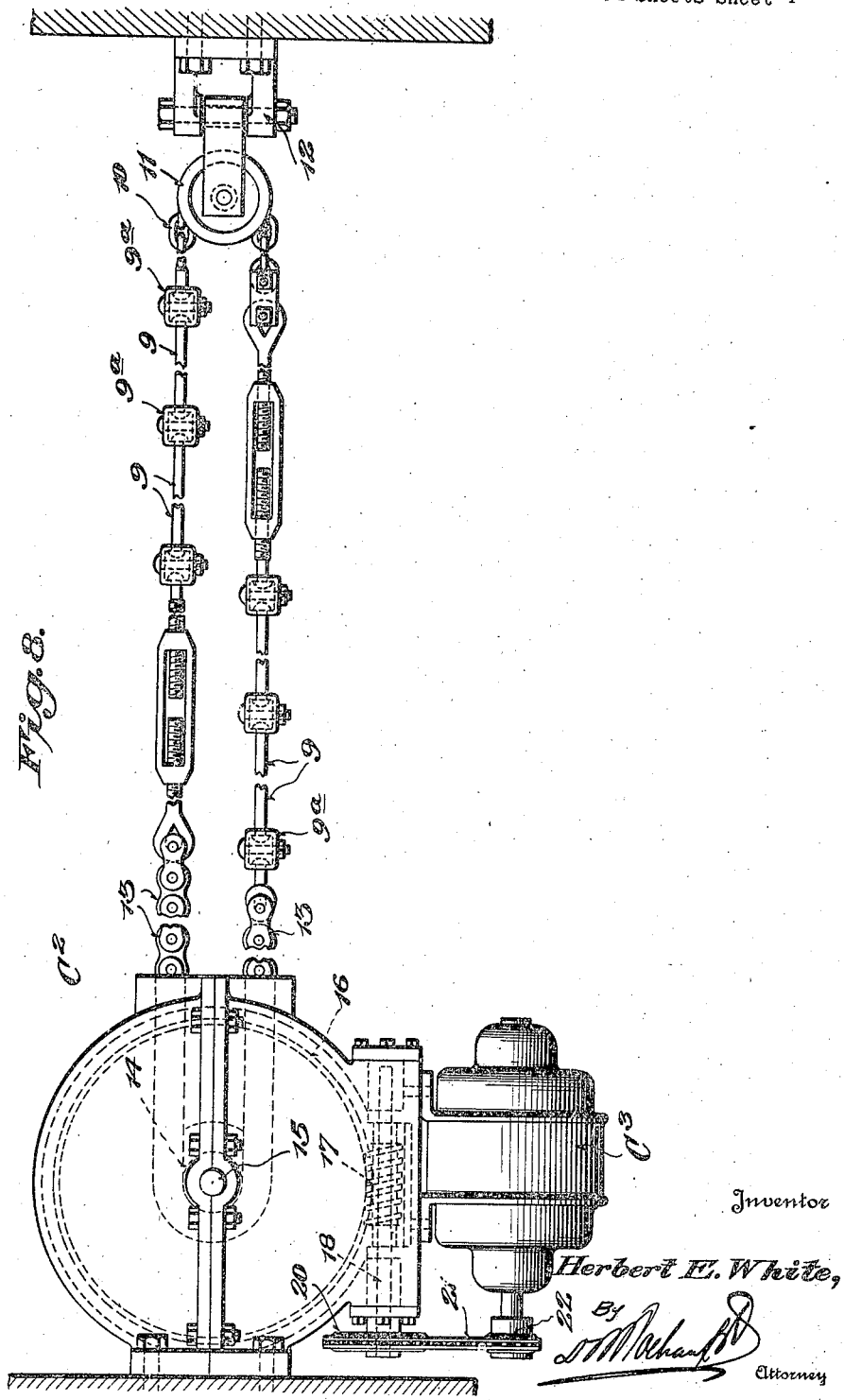

Nov. 11, 1924.　　　　　　　　　　　　　　　　　　1,515,376
H. E. WHITE
CONTROL SYSTEM FOR VENTILATING SASH UNITS
Filed Aug. 15, 1921　　　14 Sheets-Sheet 5
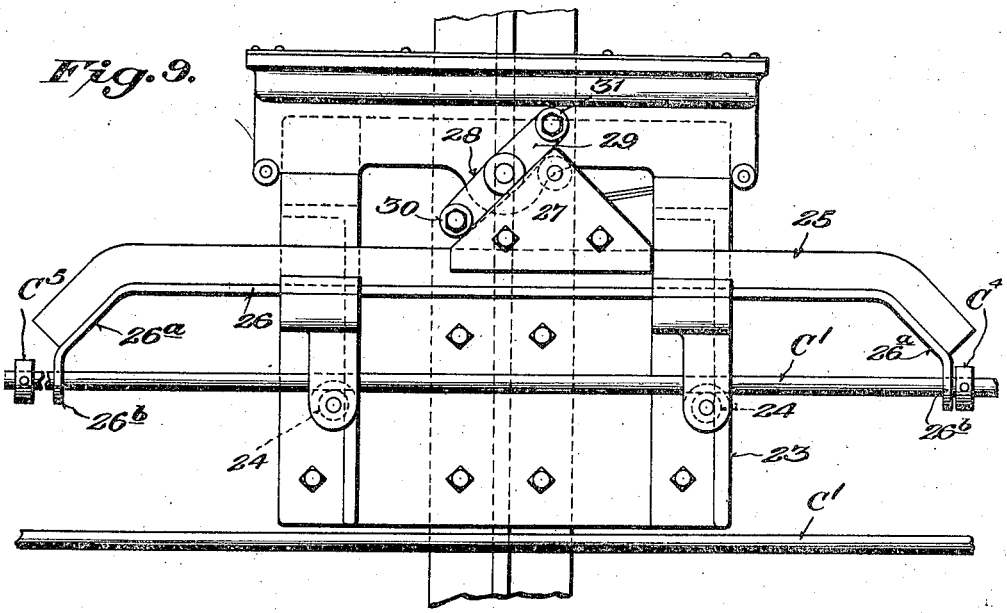
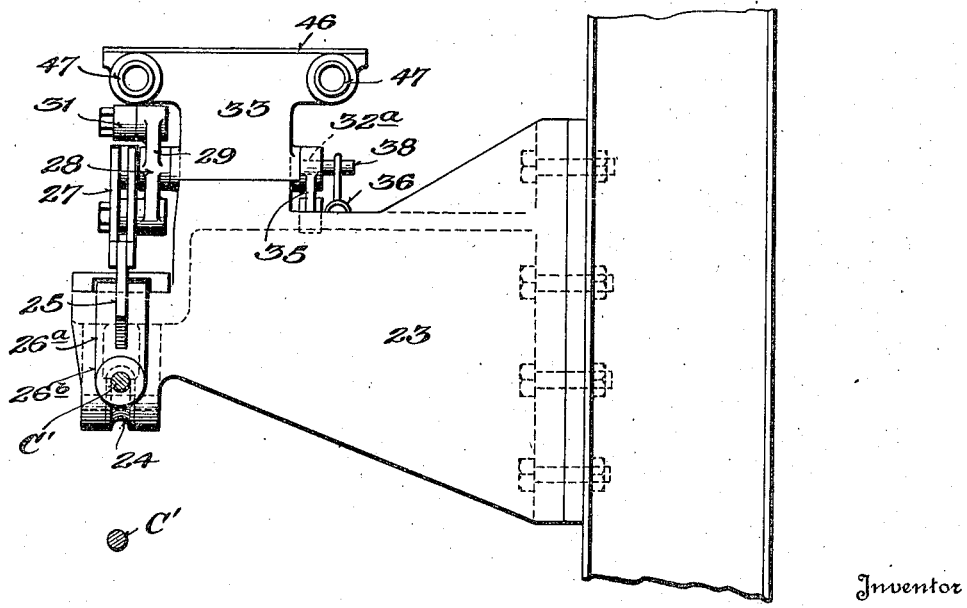
Inventor
Herbert E. White,
WITNESSES:—
By 
Attorney

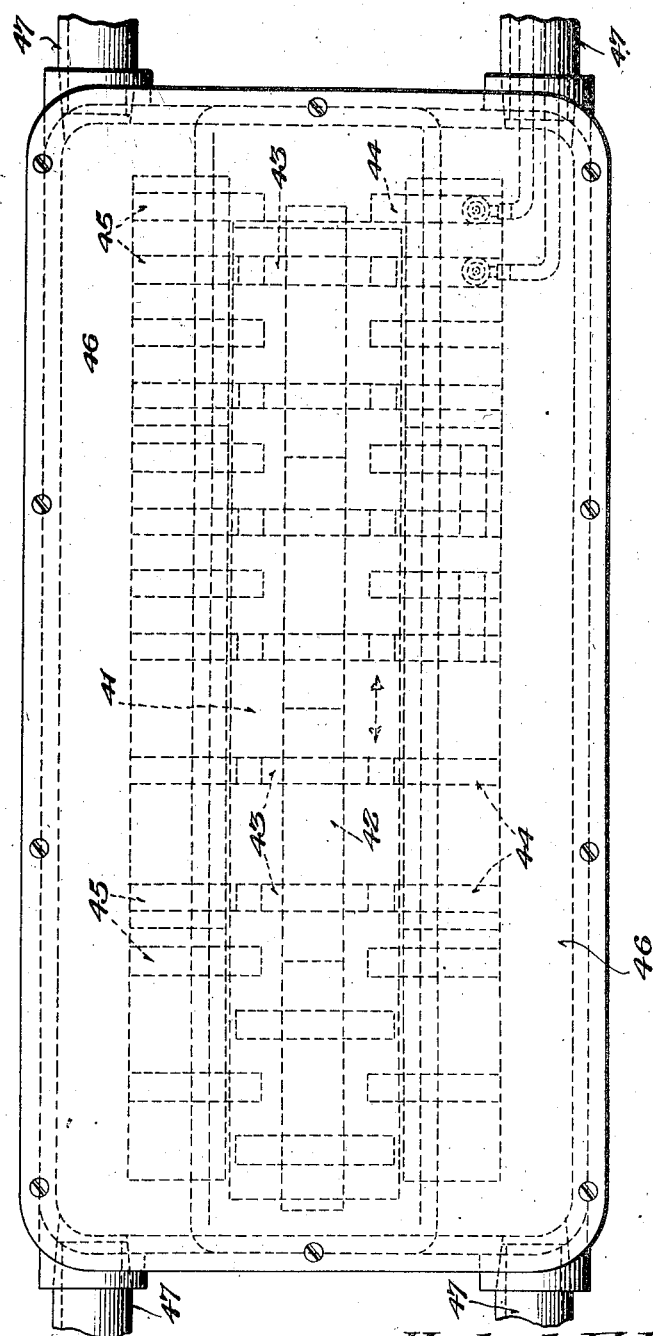

Nov. 11, 1924.                                                  1,515,376
H. E. WHITE
CONTROL SYSTEM FOR VENTILATING SASH UNITS
Filed Aug. 15, 1921      14 Sheets-Sheet 7
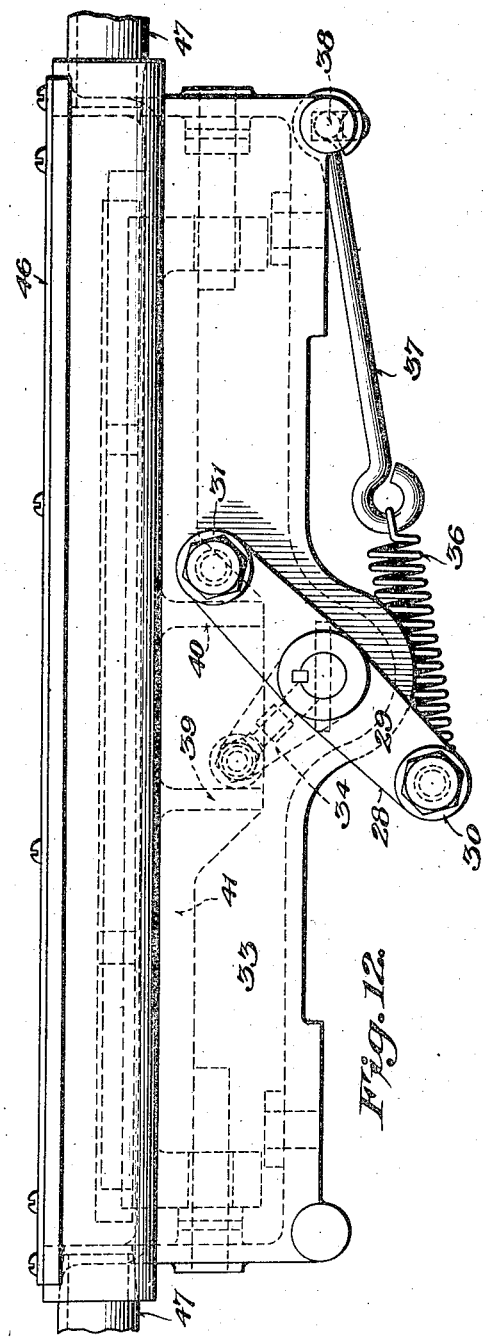
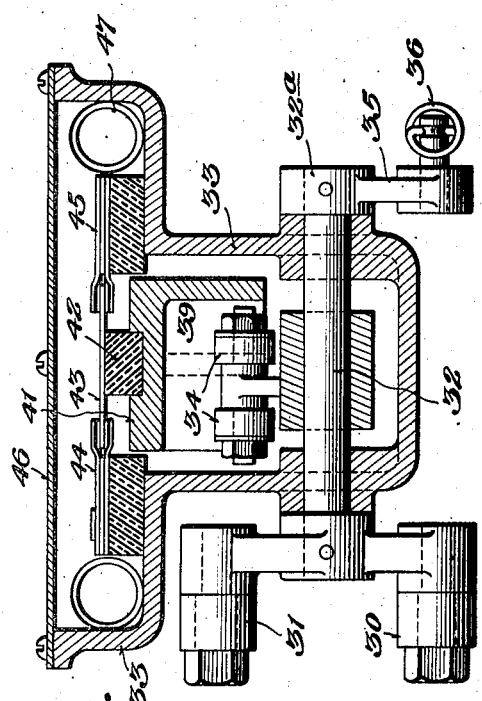
Inventor
Herbert E. White,
WITNESSES:-
By
Attorney

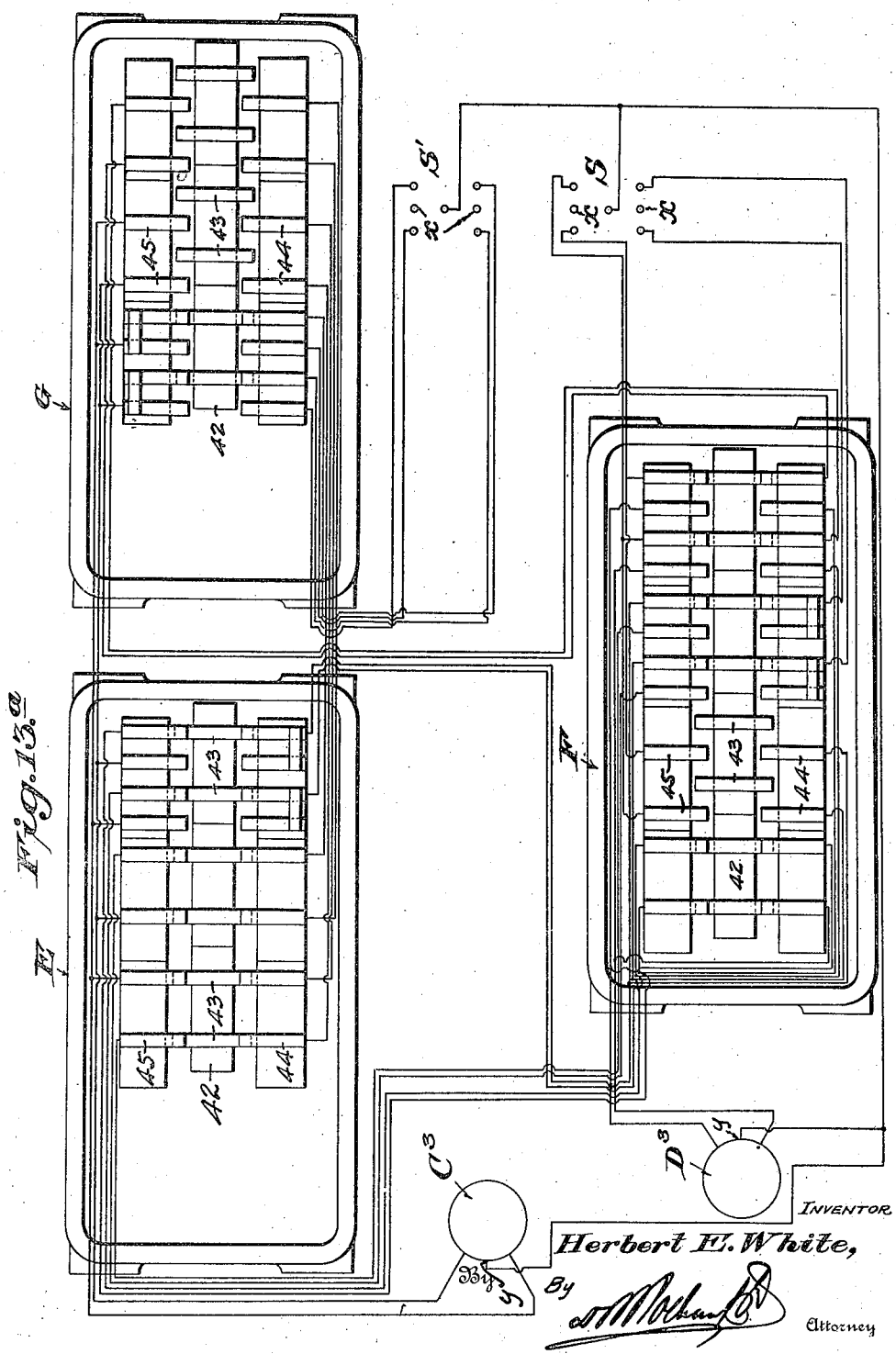

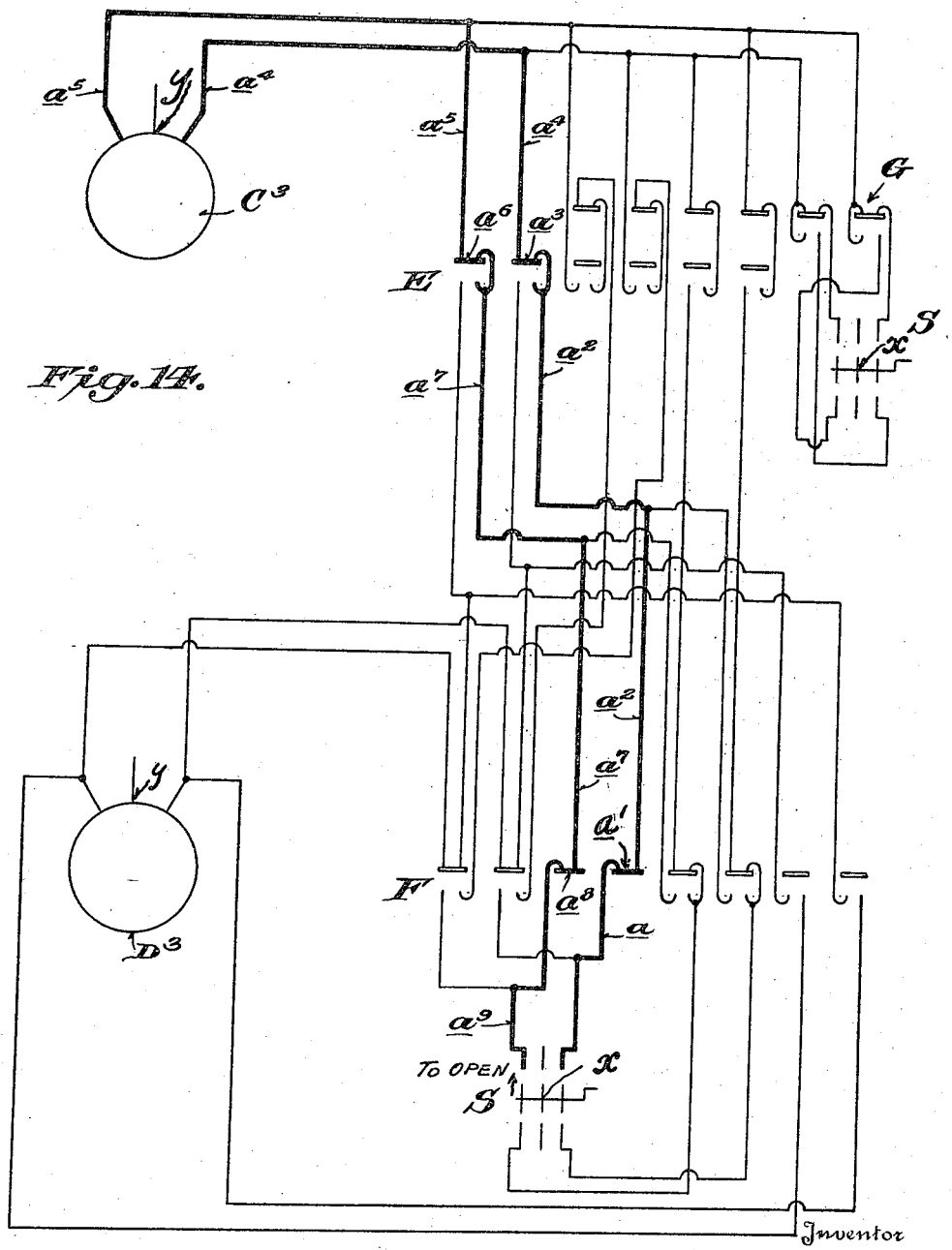

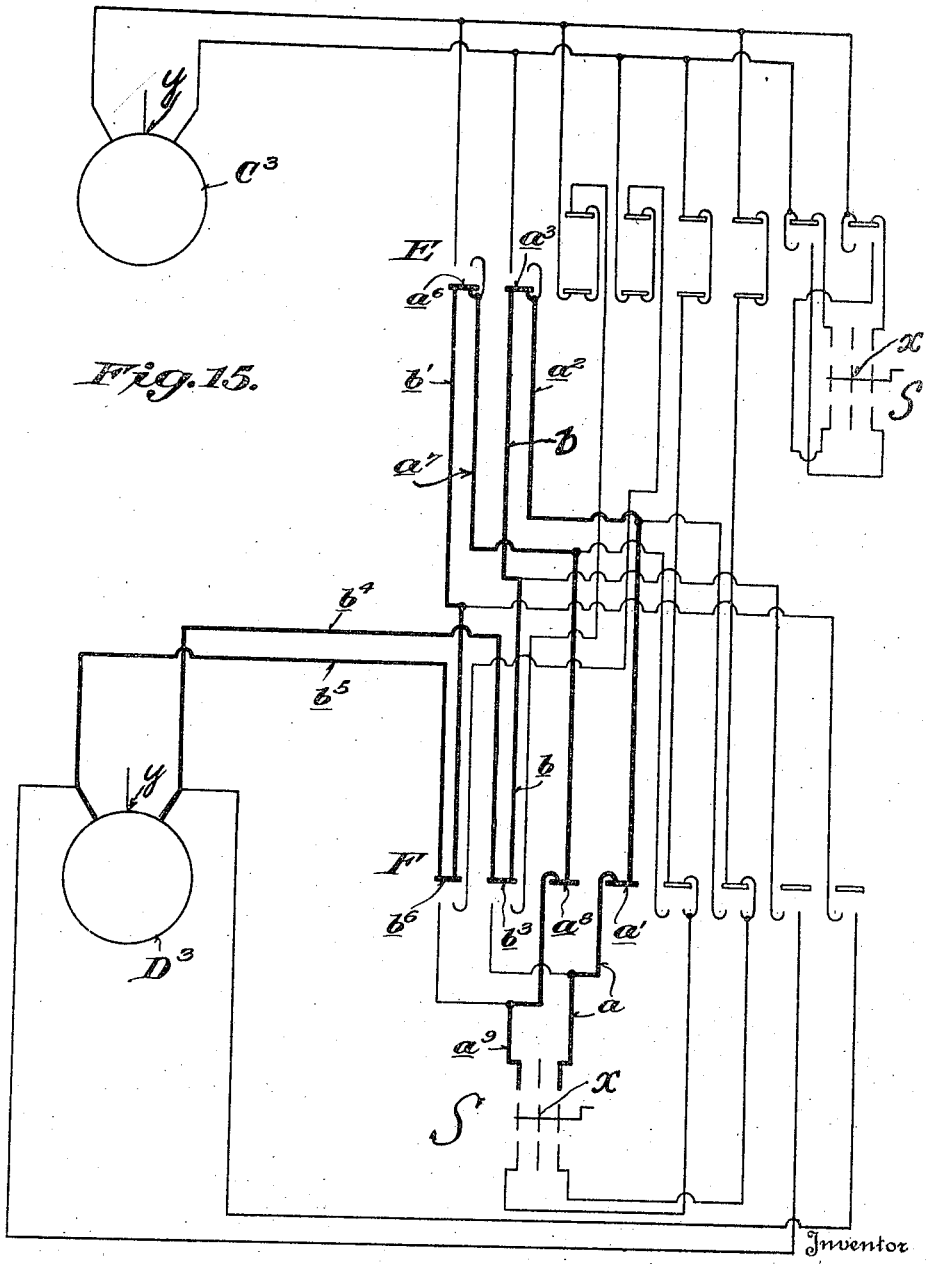

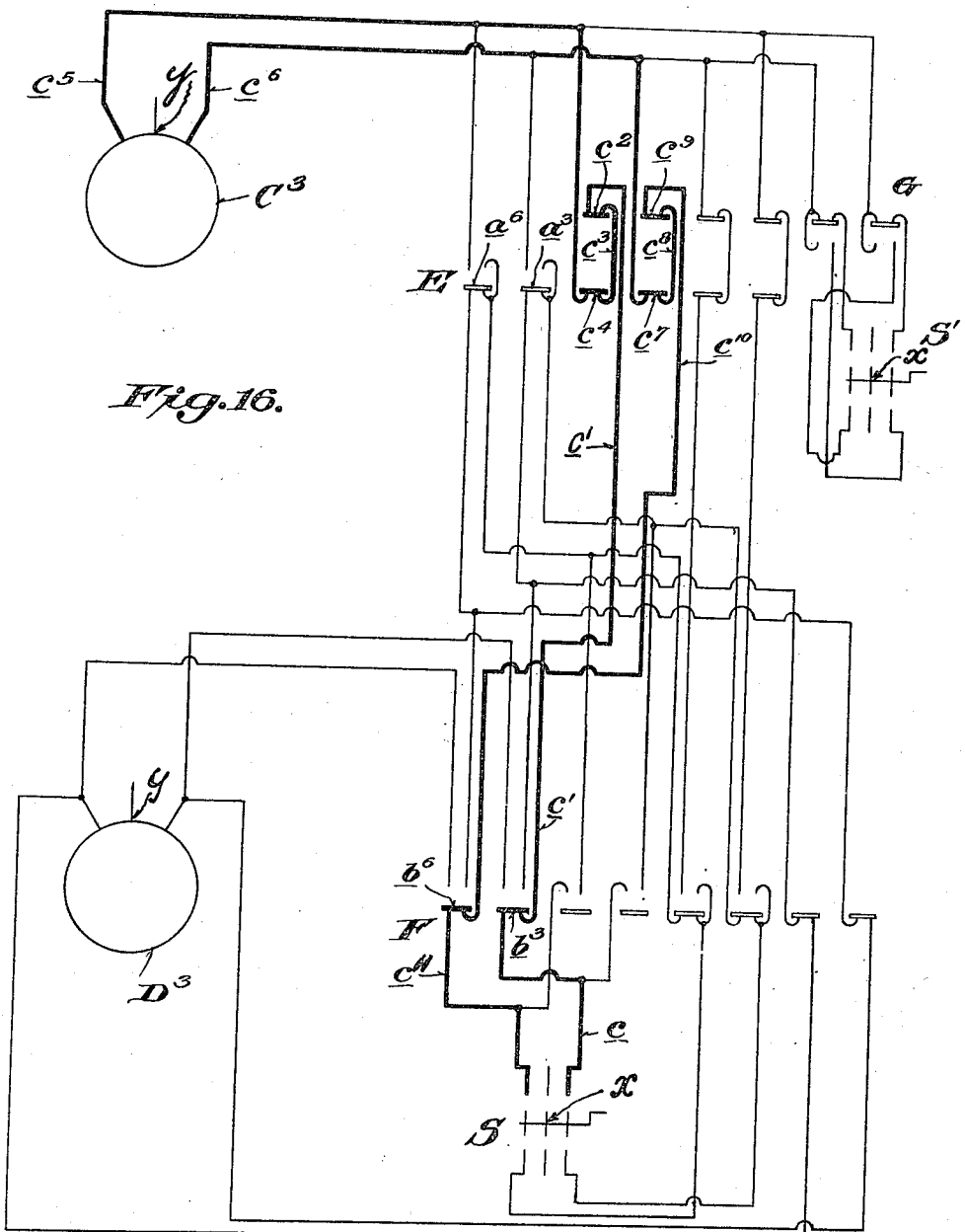

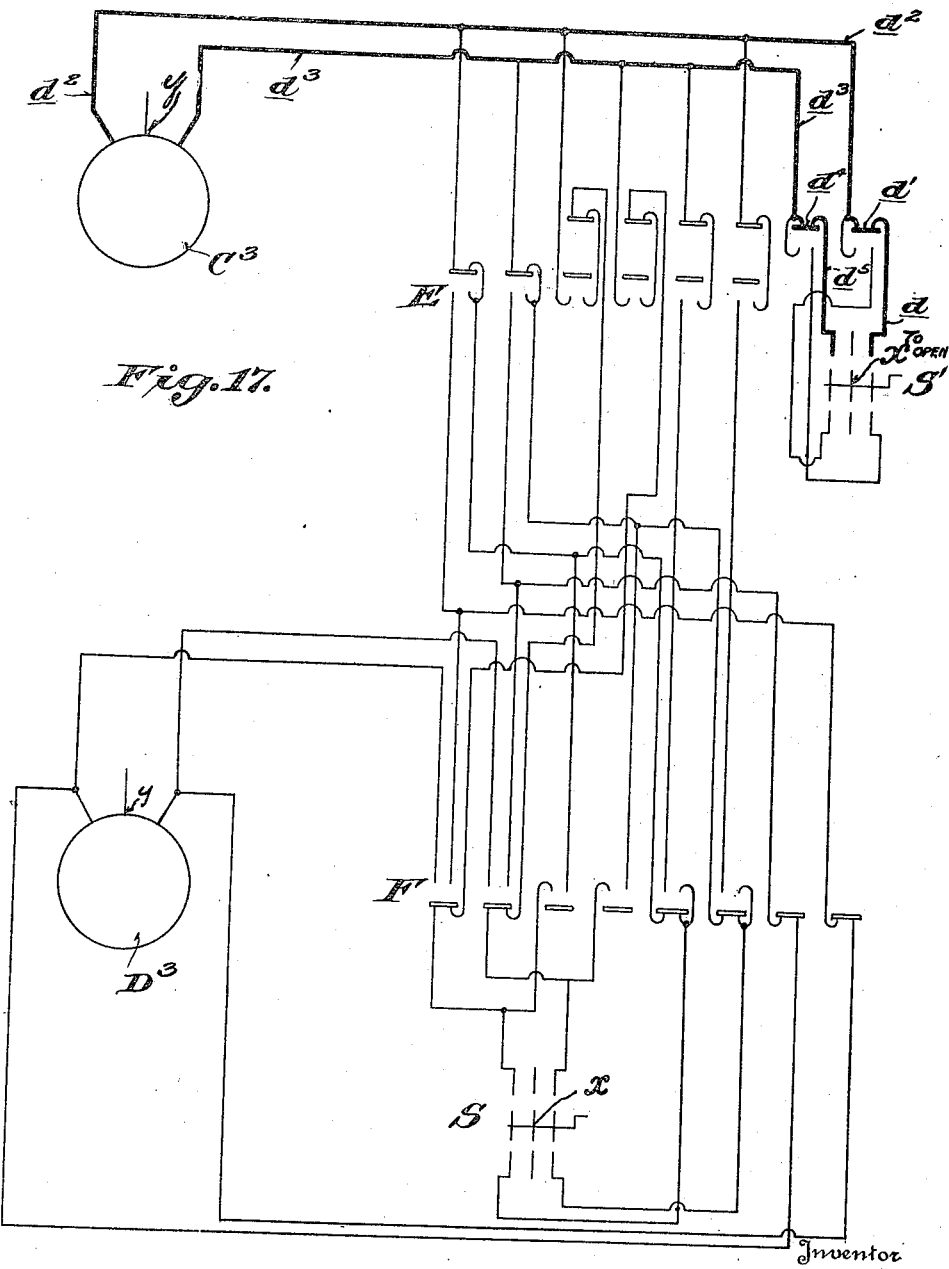

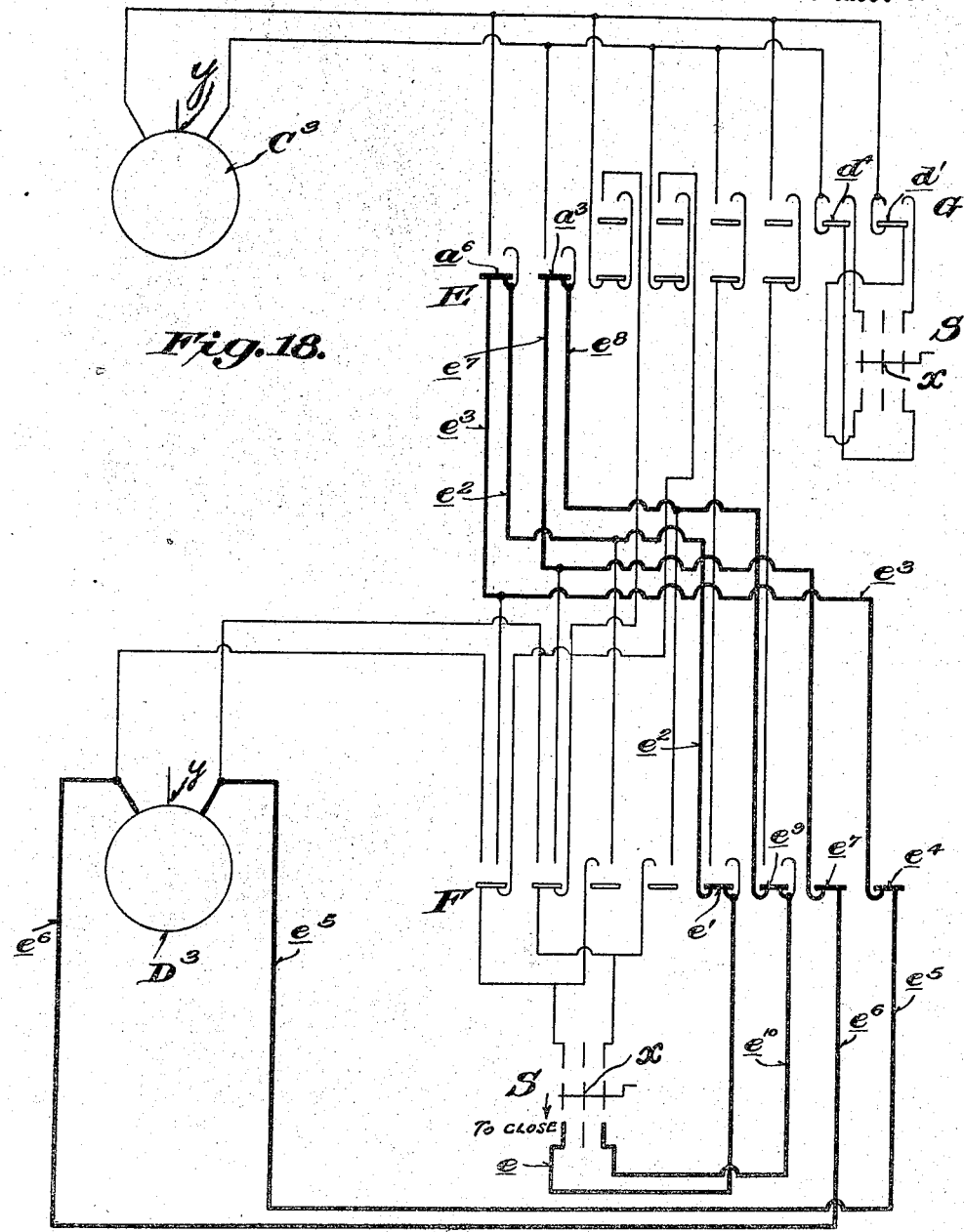

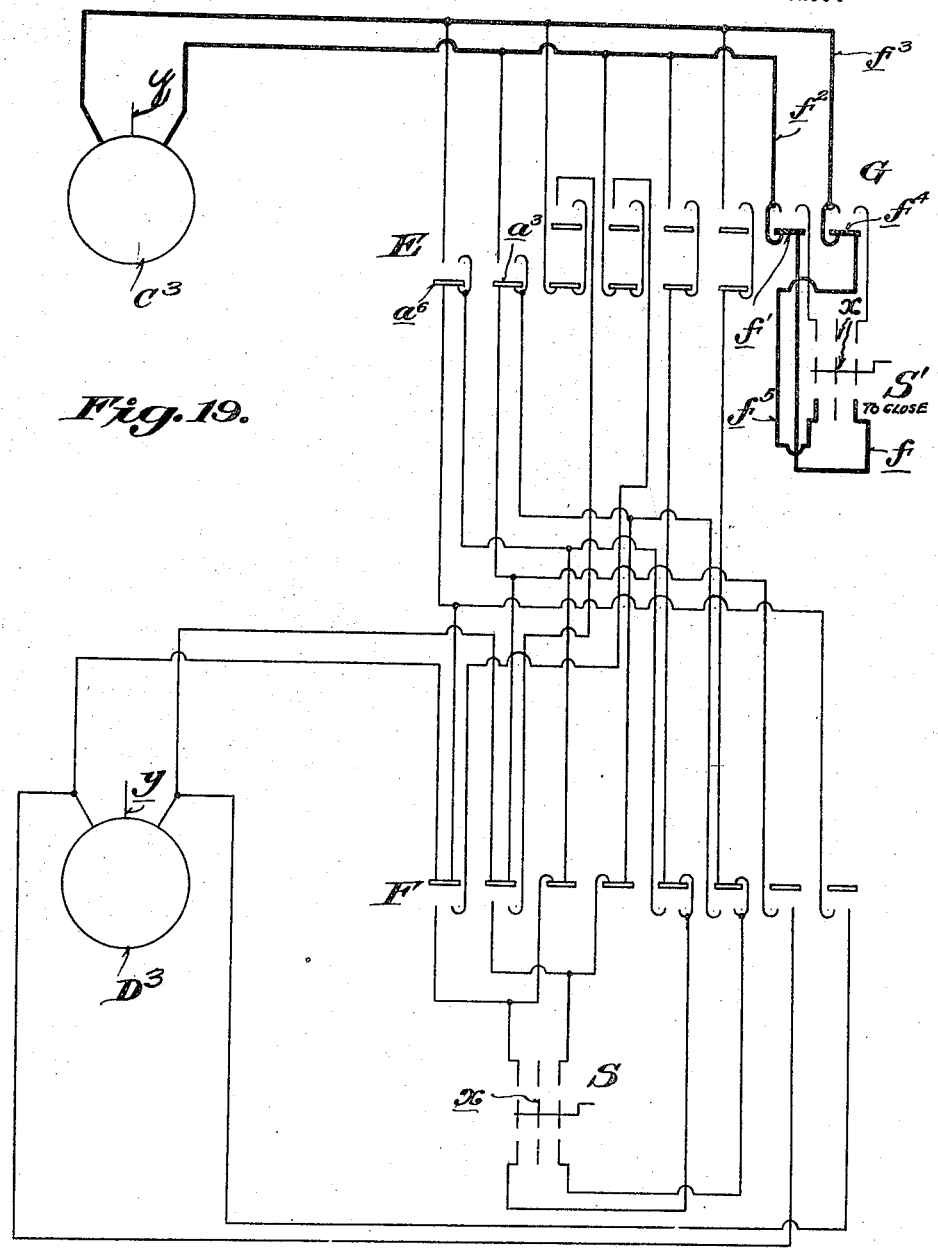

Patented Nov. 11, 1924.

1,515,376

UNITED STATES PATENT OFFICE.

HERBERT E. WHITE, OF YOUNGSTOWN, OHIO, ASSIGNOR TO THE TRUSCON STEEL COMPANY, OF YOUNGSTOWN, OHIO, A CORPORATION OF MICHIGAN.

CONTROL SYSTEM FOR VENTILATING SASH UNITS.

Application filed August 15, 1921. Serial No. 492,267.

*To all whom it may concern:*

Be it known that I, HERBERT E. WHITE, citizen of the United States, residing at Youngstown, in the county of Mahoning and State of Ohio, have invented certain new and useful Improvements in Control Systems for Ventilating Sash Units, of which the following is a specification.

This invention relates to means for controlling the adjustment of ventilating sash units of the type used in the monitors or side walls of industrial buildings, such as foundries and other shops requiring special ventilation.

Sash units of the type referred to are usually of considerable size, and because of their extensive proportions and consequent weight, manual manipulation is difficult, especially in large installations. Accordingly, the present invention has primarily in view a novel means for mechanically and automatically opening and closing the sash units in a thoroughly practical and effective manner, special provision being made for properly opening and closing the upper and lower sash units of a combined top and bottom hung installation in synchronism to effect the free movement of the units independently and without interference.

To that end, the invention is particularly directed to an electrically controlled system which is entirely automatic in its successive functions to move the sash unit to ventilating position. This operation involves first, the opening of the top hung upper sash to a sufficient degree to permit the bottom hung lower sash to be moved to an open position, and thereafter the movement of the upper sash to a closed position, leaving the lower sash open and in proper position for effective ventilation. On the other hand when it is desired to close the sash units to provide a weathertight joint therebetween, the automatic switches and motors may be readily controlled by manually changing the position of the proper hand switches.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which:—

Figure 1 is a vertical sectional view of a combined top, and bottom hung sash installation showing the sash units in closed position and the relative position of the operators.

Fig. 2 is a view similar to Fig. 1 showing the top hung sash unit partly open to give clearance for the bottom hung unit to swing outwardly.

Fig. 3 is a view also similar to Figs. 1 and 2 showing the bottom hung sash in its ventilating position and the top hung sash returned to its initial position.

Fig' 4 is a perspective view of the operators for the upper sash units when the same are closed.

Fig. 5 is a view similar to Fig. 4 showing the sash partly open.

Fig. 6 is a view similar to Figs. 4 and 5 showing the position of the operators when the upper sash is full open.

Figure 7 is a view illustrating the general arrangement of the operator rods, the motors for driving the same and the electrical control switches actuated from said rods, the view also indicating diagrammatically, for purposes of description, the master hand switch and the auxiliary hand switch.

Figure 7ª is a diagrammatic view shown at one end of Figure 7 for convenience of description and showing the relation of the electrical control switches to the various sash positions.

Fig. 8 is an enlarged detail view of one of the actuating units and the control rods.

Fig. 9 is an enlarged detail view of one of the control switches.

Fig. 10 is an end elevation of the switch shown in Fig. 9.

Fig. 11 is a top plan view of the switch shown in Fig. 9.

Fig. 12 is an enlarged detail view of the switch housing and operating connections therefor.

Fig. 13 is a vertical sectional view of the construction shown in Fig. 12.

Fig. 13ª is a diagrammatic plan view of the several central switches, of the type shown in Figures 12 and 13, illustrating the relative arrangement of said switches to each other, and to the electrical circuit.

Figs. 14 to 19 inclusive are wiring diagrams respectively showing the different positions of the main and supplemental switches for effecting automatic control of the motors for shifting the operator rods.

Similar reference characters designate corresponding parts throughout the several figures of the drawings.

Although the present system is primarily directed to an electrically controlled system for operating and adjusting the sash units, it will of course be understood that the instrumentalities involved in effecting the sash unit control may be adapted to other motive means such as compressed air, steam or the like without material change or alteration except for the type of power unit and the central devices. However, for convenience, economy, and accuracy of control automatic electrical switch units are preferred, especially since by reason of their compact form and structure, material economy of space may be effected while at the same time preserving all of the structural advantages necessary to manipulating the heavy sash units composed of steel frames and relatively thick panes of glass.

The control system is particularly adapted for the manipulation of the sash units of the type shown in Figs. 1, 2 and 3 of the drawings wherein top and bottom hung sash units A and B are employed and constitute the side wall of a monitor or like structure designated generally as M.

The specific structural features and characteristics of the said top and bottom hung sash units A and B are fully set forth in my Patent Number 1,433,441, issued Oct. 24, 1922, and therefore, so far as the present invention is concerned it will be sufficient to note that the upper sash unit A is pivotally hung at its top edge as at T, while its bottom edge is provided with a weathering apron W for over-lapping and protecting the top edge of the bottom hung sash unit B. The said bottom hung sash unit B is supported by a weather-tight hinge joint T' at its bottom edge thereby to permit the same to rock or swing outwardly as indicated in Figs. 2 and 3, when the weathering apron W of the upper sash is moved out of interfering or obstructing relation therewith.

To provide for swinging the relatively long sash units A and B on their respective hinges, the top hung unit A is provided at suitable intervals, according to the length thereof, with the operator units C, while the bottom hung sash unit B is similarly equipped adjacent its top edge with the operator units D. These operator units are respectively controlled by the shiftable operator rods $C^1$ and $D^1$ which are moved by independent actuating devices $C^2$ and $D^2$, each of which include suitable gearing and the driving motors $C^3$ and $D^3$, as will presently appear. (See Fig. 7.)

The said driving motors $C^3$ and $D^3$ of the actuating units are electrically connected with the main control automatic switch units E and F and the supplemental control switch G, and these switches E, F and G are in turn electrically connected and controlled by the manually actuated master switch S and the auxiliary switch $S^1$. That is to say, the wiring connections between the motors $C^3$ and $D^3$ and the switches E, F and G are such that they may be controlled as to certain of the operations by the hand switches S and $S^1$.

Briefly describing the operation of the switches without regard to the circuits involved at this time, it may be noted from Figures 7 and $7^a$ for example, assuming the sash units A and B to be closed, that the main switch S may be closed by hand thereby to complete the circuit through the main automatic switches F and E to the motor $C^3$ which operates the actuating unit $C^2$ for the upper sash A. The initial closing of the circuit to the motor $C^3$ actuates the operator rod $C^1$ to cause the upper sash A to swing open to a clearance position, and when the clearance position of the upper sash A is reached, a stop or abutment $C^4$ on the cable $C^1$ will engage with a suitable part of the automatic switch E to shift the contacts therein and close the circuit entirely through the automatic switch unit F for operating the lower sash B.

Upon the closing of the circuit to the automatic switch F the motor $D^3$ of the actuating unit $D^2$ will cause the lower sash to open through the movement of the operator rod $D^1$, and when the said rod has moved a distance corresponding to the extreme outward limit of opening for the lower sash B, a tappet $D^4$ on the rod will engage with a part of the automatic switch F causing the contacts therein to be shifted and thereby restore the circuit to the automatic switch unit E.

The restoration of the circuit to the automatic switch unit E involves different contacts than those employed initially to thus cause a reversal of the operation of the motor $C^3$ for actuating the upper sash A to return the latter to its closed position. Upon the upper sash unit reaching its closed position a tappet $C^5$ on the operator rod $C^1$ trips the automatic switch E and breaks or opens the circuit previously closed by the main hand switch S, and completes the automatic movement of the sashes to ventilating position.

Therefore, upon the closing of the main hand switch S three automatic operations successively take place; first, the circuit is closed through the main switches F and E and motor $C^3$ to move the upper sash unit A outwardly to a clearance position; second, upon reaching clearance position the rod $C^1$ for shifting the said unit trips the switch E and closes the circuit back through the automatic switch F to operate the motor $D^3$ thereby actuating the rod $D^1$ and permitting the lower sash unit B to move outwardly to the dotted line position indicated in Figure 7a; third, when the lower sash B reaches its outward limit the cable $D^1$ trips automatic switch F and restores the circuit to automatic switch E, but opens different contacts than those previously engaged, to thereby reverse the circuit to the motor $E^3$ to return the upper sash unit A from the dotted line position in Fig. 7a back to its original full line position. Upon reaching its closed position the switch F is shifted so that the entire circuit closed by the main hand switch S is broken and all automatic operations cease leaving the sash units A and B in ventilating position.

When the upper sash A is in its closed position with the bottom sash B open, maximum ventilation is afforded, but under some conditions of use the width of the vertical ventilating outlet may be required to be varied, or, as in case of a storm the upper sash may have to be brought into protecting position with reference to the lower sash. To accomplish this relatively independent manipulation of the upper sash A, the supplemental automatic switch G may have the circuit closed therethrough by closing the auxiliary hand switch $S^1$. That is to say, upon the closing of the circuit to switch G by hand switch $S^1$, the motor $C^3$ will operate to cause the rod $C^1$ to open the sash A and the latter may be stopped at any point in its outward travel by simply opening the switch $S^1$. However, if the rod $C^1$ moves sufficiently to cause the tappet $C^6$ to trip the switch G the circuit will be automatically broken because the sash A has reached its extreme outward limit. And, as will hereafter more fully appear, the upper sash A must move to its outward limit to trip both switches G and E to permit both sashes A and B to be returned to closed position.

As both switches E and G are tripped by tappets on the same operator rod $C^1$, obviously, the relative spacing of the tappets $C^4$ and $C^6$ respectively from the shifter bars of the switches E and G must be different. For example tappet $C^4$ will be spaced closer to the arm of switch E than the tappet $C^6$ will be to the arm of switch G, because switch E must operate in the cycle of operations effecting automatic opening and into which operation the switch G does not enter. However, when the switch G serves as a connector for closing the circuit to the motor $C^3$ upon the closing of auxiliary hand switch $S^1$, the movement of the rod $C^1$ will of course cause tappet $C^4$ to first strike the shifter bar of switch E causing it to trip idly and then move idly on to permit the tappet $C^6$ to strike the shifter arm of the switch G as the sash reaches its maximum outward limit.

The idle tripping of switch E as above referred to simply permits the same to be set for the subsequent operation for effecting the closing of both sashes, namely the lower sash B first and upper sash A last. Assuming then that the upper sash unit A has reached its extreme outward limit by the closing of the circuit at hand switch $S^1$, a tappet $C^6$ on the cable $C^1$ trips the switch G to break the circuit from said auxiliary switch and leaves the upper sash unit A in its outwardly advanced position. Then, as both sash units A and B are in the dotted line positions shown in Fig. 7a it will be apparent that the lower sash unit B may be moved to its closed position.

To accomplish this closing of the lower sash unit B the main hand switch S is shifted from the position marked "To Open" in Fig. 7 to the position marked "To Close," thereby completing the circuit through the automatic switch F, and certain contacts of the main automatic switch E, which were caused to be engaged at the end of the operation involving the opening of the upper sash as above described, thereby to drive the motor $D^3$ of the lower actuating unit $D^2$ and bring the sash to its closed position. As the rod $D^1$ brings the lower sash B to its closed position a tappet $D^5$ thereon will engage a suitable portion of the automatic switch F to trip the same and break the circuit which had been completed by the closing of the main manually operated switch S.

The above operation leaves the upper sash A still in its outwardly advanced position and to close the same the auxiliary switch $S^1$ must be shifted from the position marked "To Open" to the position marked "To Close" to thereby complete the circuit again through the supplemental switch G, but in a reverse direction, thereby reversing the circuit to the motor $C^3$ and shifting the rod $C^1$ in a direction to swing the upper sash unit A from outwardly open to inwardly closed position. As the rod $C^1$ completes its movement to bring the sash A inward to a closed position, a tappet $C^7$ thereon trips the automatic switch G and breaks the circuit through the auxiliary switch S while at the same time the tappet $C^5$ again engages with a part of the automatic switch E to shift the contacts thereof in position to complete the circuit upon the next closing of the circuit through the main hand switch S to again effect the opening of the sash units A and B to ventilating position.

In opening the sashes A and B to ventilating position the main automatic switches E and F cooperate completely to effect the automatic operation of the sash units, but in order to accomplish the closing or resetting of the sash units to initial position the supplemental automatic switch G and auxiliary hand switch S¹ must be brought into operation, as well as the main hand switch S, as above described.

Referring now more particularly to the details of construction and arrangement for carrying the foregoing system into operation, reference will now be made to the individual structural units illustrated in the accompanying drawings. However, it will be understood that these units are necessarily susceptible of a wide range of modification but the construction illustrated provides simple, practical and convenient means for accomplishing the desired function.

As previously explained the sash units A and B are respectively hung at their top and bottom edges, for the purpose of swinging the sash units on their respective hinges the operator units C and D are employed. These units may be of identical construction for both top and bottom sash units, so for the purposes of illustration the operator units for the top sash only may be taken as an example.

By reference to Figures 4, 5 and 6 it will be seen that these operators essentially consist of swinging arms 1, 2 and 3 which move in a horizontal plane and the lifting arms 4 which are of the horizontal compensating type, that is, a type which swings through a horizontal plane, and so arranged that the leverage on the sash grows constantly greater as the load increases. The said arms 1, 2 and 3 are carried upon a support 5 and preferably have two pivoting centers 6 and 7 on the support which gives increased power, thereby eliminating the necessity of counterweights except where the lengths of the run of the sash are extreme. The lifting arm 4 is connected to the end of the swinging arm 2 as at 4ᵇ while the point of pivotal connection 2ᵃ between the arms 1 and 2 is provided with a clip 8 for engaging with either the upper or lower run of the operating rod or cable C¹ according to whether the operator is a right or left hand unit as will be observed from the drawings.

It is one of the distinctive features of the operators that the same are made in right and left hand units because this arrangement eliminates side thrust on the sash and materially contributes to the strength and stability of the instrumentalities for moving the sash outwardly.

The operator rods C¹ and D¹ preferably consist of a plurality of steel rods 9 joined by steel couplings 9ᵃ at lengths of approximately twenty feet, and the end rods of the upper and lower runs are connected by a chain 10 at one end which passes over an idler wheel 11 supported in a bracket 12 carried by the framing of the building. The other end of the rods 9 are connected by a sprocket chain 13 engaging over a sprocket wheel 14 carried upon a shaft 15 having thereon an actuating gear 16. The said actuating gear and sprocket 14 constitute a part of the actuating units, C² for example, shown in Figure 8, and as will be seen from this figure the said gear wheel 16 is adapted to be engaged by a worm wheel 17 mounted upon a shaft 18 having thereon a driving sprocket 20 which is coupled by driving chain 21 with the driving pinion 22 of the driving motor C³.

Each actuating unit or operating station, therefore primarily includes a sprocket for shifting the upper and lower runs of the operating rod and a suitable motor for operating the sprocket. As previously indicated this motor is preferably of the electrical type and in order to synchronize the operation of the motors C³ and D³ respectively for the top and bottom sash units the series of electrical switches, E, F and G, and the hand switches S and S¹, are employed.

Referring first to the automatic switches E, F and G, it is pointed out that these switches are of substantially the same construction, and therefore a description of the structural features of one switch will answer for the others and for the purpose of convenience the switch unit E may be described.

In its general organization this switch unit includes a supporting bracket 23 (see Figures 9–10) adapted to be attached to one of the frame parts of the building at suitable locations along the zone of the operating rod C¹ for example. The front portion of the bracket may be provided with rollers 24 for supporting and guiding the upper run of the operator rod C¹; and, as previously indicated, the said operator rod carries at spaced intervals the tappets C⁴ and C⁵, adapted to alternately engage with opposite ends of a switch shifting bar 25.

As shown in Figure 9 of the drawings the said switch shifting bar 25 may be formed by an inverted T-shaped bar having the relatively horizontal body portion 26 and the downwardly inclined ends 26ᵃ terminating in the pendant abutment shoulders 26ᵇ for engaging with the tappets C⁴ and C⁵. The intermediate portion of the body 26 carries an actuating cam 27 of substantially triangular formation, the upper sides of which are adapted to cooperate with a suitable tumbler yoke 28.

The said yoke 28 preferably consists of the cross arm 29 having the offset roller abutments 30 and 31, and is suitably fastened to a rock shaft 32 journalled in the switch casing 33 and having fitted to its intermediate portion within the casing a switch block throwing arm 34. For the purpose of placing the shaft 32 under tension to provide the desired snap action for the switch, the end $32^a$ of the shaft may be provided with an arm 35 adapted to be engaged by tension spring 36 which is in turn connected by link 37 with the casing 33, as indicated at 38. And, as will be seen from Figures 12 and 13 the switch block throwing arm 34 is adapted to operate between and alternately engage the depending abutment walls 39 and 40 of the switch block 41.

The body of the switch block may be of metal and to provide the necssary insulation for the shiftable switch contacts carried thereby an insulating block 42 may be employed, the same being fastened thereto in any suitable and convenient manner to render it in effect an integral part of the switch block 41.

The series of flat contact blades 43 carried by block 42 are adapted to engage at desired intervals with the oppositely disposed stationary contact members 44 and 45, which are electrically connected with the motors $C^3$ and $D^3$, and also with the hand switches in a manner which will hereinafter more fully appear upon reference to the wiring diagrams showing the circuits involved. As will also be observed from the drawings the casing 33 of the switch may be provided with a suitable cover 46 for concealing and housing the switch contacts while the ends of the casing may be tapped or otherwise provided with openings for receiving the usual wiring conduits 47.

The foregoing type of switch is intended to be operated by the movement of an operator rod, $C^1$ for example, due to the engagement of one of the abutments on the rod with the switch shifter bar 25, which will move the operating cam 27 to cause one side thereof to engage with the roller 30 and lift the tumbler yoke 28 past center whereupon the spring 36 will snap roller 31 down into engagement with the other side of the cam when the switch shifter bar 25 is moved in the opposite direction by another tappet on the operator rod or shaft in the manner which will be readily apparent.

By reference to the wiring diagrams illustrated in Figure $13^a$ and particularly in Figures 14—19 it will be observed that Figure 14 shows the position of the switches E, F and G when both upper and lower sash units A and B are closed. The heavy line circuit indicates the path of the current through the main switches F and E upon the closing of the main hand switch S. That is to say, upon the shifting of the switch S to the position marked "To Open" the circuit will be completed through line $a$, contact $a^1$ of switch F, thence through line $a^2$ to contact $a^3$ of main switch E. From the switch E the circuit takes a path through the line $a^4$ to the motor and thence returns through line $a^5$, blade $a^6$ to switch E, line $a^7$ to contact $a^8$ of switch F and thence back to the switch through connection $a^9$. The closing of this circuit causes the motor $C^3$ to operate thus opening the top sash unit A through the medium of the rod $C^1$ and when the tappet $C^4$ on the operator rod $C^1$ trips the switch E the contacts $a^3$ and $a^6$ of the said switch E will be shifted to the opposite terminals of the switch to thereby rearrange the circuit from the main switch S from the line $a^2$ to the line $b$ and from the line $a^7$ to the line $b^1$.

The position of parts will then be as shown in Fig. 15. Assuming the circuit to flow through the connections $a^2$—$b$, the same will pass from the line $b$ to the contact $b^3$ of the switch F, thence to line $b^4$ to the motor $D^3$. From the motor the circuit will be completed back through the line $b^5$, contact $b^6$ of the switch F to the line $b^1$. The closing of the circuit through these connections will cause the lower motor $D^3$ to operate and thus move the lower operator rod $D^1$ to open the lower sash unit B, and when the tappet $D^4$ on the operator rod trips the switch F the contacts $b^3$ and $b^6$ of the switch F will be shifted to their opposite terminals which will restore the circuit again to the upper switch unit E, but in a reverse direction to that initially supplied to switch E from switch F.

The effect of the shifting of the contacts $b^3$ and $b^6$ of the switch F to the opposite terminals of that shown in Figure 15, thereby reversing the current to the motor $C^3$ is to return the upper sash unit A to closed position.

Referring now to the circuit shown in heavy lines in Figure 16 for accomplishing the return of the upper sash it will be observed that the circuit will flow through line $c$ to switch contact $b^3$ to switch F and thence through line $c^1$ through switch contact $c^2$ of switch G and thence through connections $c^3$ to contact $c^4$ of switch E which is connected with the motor $C^3$ by the line $c^5$. From the motor the circuit makes its way back through the connection $c^6$ to the contact $c^7$ of switch E and thence through connection $c^8$ to contact $c^9$ of switch G and from this point through the line $c^{10}$ to the blade $b^3$ of switch F and thence to the hand switch S by the connection $c^{11}$. The effect of the current following the path of this circuit is to reverse the motor C to return the upper sash unit A to closed position, leaving the lower sash unit B open for ventilation. When the operator rods $C^1$ reaches substantially its limit of travel to bring the upper sash unit A to a closed position the tappet $C^5$ thereof trips the switch E and shifts the contacts $c^4$ and $c^7$ to the opposite terminals out of engagement with the line connections and leaves them in the position shown in Figure 17.

When the contacts $c^4$ and $c^7$ are in the position shown in Figure 17 the automatic operation of opening the upper and lower sash units has been completed and the circuit closed by the hand switch S is automatically broken, and all of the sash units may remain in the ventilating position.

When the electrical connections and switches are in the position shown in Fig. 17 the upper sash A may be moved outwardly to its extreme outward limit or any intermediate degree, and as all circuit connections leading to the lower motor $D^3$ are broken or open until the upper sash reaches its outward limit it will be impossible to effect a false return of the lower sash unit B while the upper sash unit A is thus manipulated.

To trace the circuits in intermediate and extreme outward position of the upper sash, reference may be made to Figure 17. When the auxiliary hand switch S is shifted to the position marked "To Open" it will have the effect of closing the circuit through line $d$, contact $d^1$ of switch G, line $d^2$ to the motor $C^3$, the return circuit being made through connection $d^3$, contact $d^4$ of switch G and connection $d^5$. When the circuit is caused to follow this path the motor C will be operated to swing the upper sash unit A outwardly, and should the switch $S^1$ be opened at any point during the travel of the upper sash unit A outwardly, before reaching its maximum outward limit, the sash unit A will remain in an intermediate or partly open position.

However, in order to place the switches E and F in operative condition to make the actuation of the lower sash unit B possible, as when effecting a complete closing of sash units A and B, it is necessary that the upper sash unit A travel to its extreme outward limit, thereby causing the tappet or stop $C^6$ on the operator rod $C^1$ to trip the switch G which will have the effect of breaking the circuit to the motor $C^3$ and preventing the sash A from moving further outward than its maximum limit. Approximately simultaneously with the tripping of the switch G by the tappet $C^6$, the tappet $C^4$ on operator rod $C^1$ will also trip switch E. The result of the tripping of the switches G and E by the movement of the sash A to its outward limit is shown in Fig. 18 of the drawings.

From Figure 18 it will be observed that the contacts $d^1$ and $d^4$ of the switch G are shifted to the opposite terminals, and likewise the contact blades $a^3$ and $a^6$ of switch E are shifted onto the lower terminals in the switch diagram. The fact that contacts $d^1$ and $d^4$ of switch G are shifted to their opposite terminals at this stage of the operation does not in any way affect the operation of the motor $C^3$, but simply places the contacts in position for a subsequent actuation of the motor as will presently appear.

However, the shifting of the contacts $a^3$ and $a^6$ onto the lower terminals in the switch diagram of Figure 18 is important, since with the electrical instrumentalities in the position shown in this figure the main hand switch S may be moved in the direction of the arrows to close the circuit to the motor $D^3$ to swing the lower sash unit B inwardly through the connections which will now be described. From the main switch S the circuit may be assumed to travel through wire $e$ to contact $e^1$ to switch F and from thence through line $e^2$ to contact $a^6$ of switch E to thence through wire $e^3$ to contact $e^4$ of switch F from which point it is conducted to the motor $D^3$ by wire $e^5$. From the motor $D^3$ the circuit may return through wire $e^6$ to contact $e^7$ to automatic switch E and from thence through contact $a^3$ of switch E to wire $e^8$ and from wire $e^8$ through contact $e^9$ of switch F back to the switch S through line $e^{10}$. As the lower sash unit B reaches its inward limit, that is, its normal closed position, the tappet $D^5$ will trip switch F to throw the contacts thereof from the position shown in Figure 18 to the position shown in Figure 19.

When the electrical connections rest in the position shown in Figure 19 the main switch S is inoperative because the contacts $a^3$ and $a^6$ are not in engagement with the proper terminals. It is therefore impossible to make a false movement of either motor $C^3$ or $D^3$ through the closing of the main hand switch S. The only switch that is operative in this condition of the circuits is the auxiliary hand switch $S^1$ which can now be operated to bring the upper sash from an open to a closed position and in overlapping relation to the lower sash unit B.

Upon reference to Figure 19 it will be seen how the above is accomplished. The auxiliary switch $S^1$ is moved downwardly in the direction of the arrows to the position marked "To Close". The circuit may then be assumed to flow from the switch through line $f$ to contact $f^1$ of switch G, thence through line $f^2$ to motor $C^3$ and back through line $f^3$ to contact $f^4$ which is connected with the switch $S^1$ by the line $f^5$. The circuit in following this path will energize the motor $C^3$ and cause the operator rod $C^1$ to bring the upper sash A into closed relation to the bottom sash and in such a manner that the weathering-apron thereof will form a weather-tight joint between the sash. When the upper sash A reaches substantially the inward limit of its movement the tappets $C^5$ and $C^7$ thereon will trip switches E and G to shift all of the contact blades of each switch from the lower terminals of the switch diagram in Figure 19 back to the upper terminals of the switch diagram shown in Fig. 14. When the electrical instrumentalities are thus shifted back to the position of Figure 14 the cycle of operation may be repeated. That is, the closed sash units A and B may be reopened in the manner previously described.

The wiring connections shown are intended for operation in connection with three-phase motors and the parts marked $x$ on the hand switches are directly connected to the center terminals $y$ of the motors.

From the foregoing it will be apparent that the present invention provides a simple and practical system for operating or manipulating combined top and bottom hung sash units, making adequate compensation for the relatively great weight of the sash units through proper leverage and distribution of operating parts. By providing means for insuring the automatic shifting of the sash units to ventilating position and semi-automatic means for returning them to normal closed position, all possibility of false shifting movements which would be disastrous on account of the great size of the sash, are eliminated.

I claim:—

1. A control system for coacting swinging closures, including operating mechanism for each closure, and means for causing one closure to move in advance of the other closure until it reaches a clearance position and continuing the movement of said other closure to a position past the first closure.

2. A control system for oppositely hung swinging sash whose meeting edges overlap to provide a weather-tight joint including operating means for each sash, and means for controlling said operating means to cause the movement of one sash in either direction to follow the movement of the other.

3. A control system for top and bottom hung sash whose meeting edges overlap to provide a weather-tight joint including operating means for each sash, and means for controlling said operating means to cause the movement of one sash in either direction to follow the movement of the other.

4. A control system for top and bottom hung sash including separate operating means for each sash, and controlling means cooperating with said operating means to cause the top sash to swing to an open position in advance of the opening movement of the bottom sash.

5. A control system for top and bottom hung sash including separate operating means for each sash, and controlling means cooperating with said operating means to cause the top sash to move to an open position in advance of the bottom sash and then to close.

6. A control system for top and bottom hung sash including separate operating means for each sash, and controlling means cooperating with said operating means to cause the top sash to move to an open position in advance of the opening of the bottom sash and then to automatically close.

7. A control system for top and bottom hung sash including separate operating means for each sash, and controlling means cooperating with said operating means to cause the top sash to move to an open position prior to either the opening or closing of the bottom sash.

8. A control system for top and bottom hung sash including separate operating means for each sash, and controlling means cooperating with said operating means to cause the top sash to move to a clearance position in advance of the opening of the bottom sash and then automatically to close, said controlling means also cooperating with the operating means to cause the top sash to open to a clearance position followed by the closing of the bottom sash and the closing of the top sash.

9. A control system for top and bottom hung sash whose meeting edges overlap to provide a weather-tight joint including motor operating means for each sash, and an electrical control for said motor operating means for causing the movement of one sash in either direction to follow the movement of the other.

10. A control system for top and bottom hung sash including motor operating means for each sash, and an electrical control for said motor operating means for causing the top sash to swing to an open position in advance of the opening movement of the bottom sash.

11. A control system for top and bottom hung sash including motor operating means for each sash, and an electrical control for said motor operating means for causing the top sash to move to an open position in advance of the bottom sash and then to close.

12. A control system for top and bottom hung sash including motor operating means for each sash, and an electrical control for said motor operating means for causing the top sash to move to an open position in advance of the opening of the bottom sash and then to automatically close.

13. A control system for top and bottom hung sash including motor operating means for each sash, and an electrical control for said operating means for causing the top sash to move to an open position prior to either the opening or closing of the bottom sash.

14. A control system for top and bottom hung sash including motor operating means for each sash, and an electrical control for said motor operating means for causing the top sash to move to a clearance position in advance of the opening of the bottom sash and then automatically to close, said controlling means also cooperating with the operating means to cause the top sash to open to a clearance position followed by the closing of the bottom sash and the closing of the top sash.

15. A control system for coacting swinging closures, including operating mechanism for each closure, and means for causing the closures to initially move one in advance of the other, said means moving the following closure a greater distance than the closure initially in advance of the same.

16. A control system for top and bottom hung sash including power driven operating means for each sash, and controlling means having devices actuated by said operating means for causing the movement of one sash in either direction to follow the movement of the other.

17. A control system for top and bottom hung sash including power driven operating means for each sash, and controlling means having devices actuated by said operating means for causing the top sash to swing to an open position in advance of the opening movement of the bottom sash.

18. A control system for top and bottom hung sash including power driven operating means for each sash, and controlling means having devices actuated by said operating means for causing the top sash to move to an open position in advance of the bottom sash and then to close.

19. A control system for top and bottom hung sash including power driven operating means for each sash, and controlling means having devices actuated by said operating means for causing the top sash to move to an open position in advance of the opening of the bottom sash and then to automatically close.

20. A control system for top and bottom hung sash including power driven operating means for each sash, and controlling means having devices actuated by said operating means for causing the top sash to move to an open position prior to either the opening or closing of the bottom sash.

21. A control system for top and bottom hung sash including power driven operating means for each sash, and controlling means having devices actuated by said operating means for causing the top sash to move to a clearance position in advance of the opening of the bottom sash and then automatically to close, said controlling means also cooperating with the operating means to cause the top sash to open to a clearance position followed by the closing of the bottom sash and the closing of the top sash.

22. A control system for top and bottom hung sash including motor actuated operating means for each sash, and an electrical controlling circuit for the motors including switches actuated by said operating means to provide for causing the movement of one sash in either direction to follow the movement of the other.

23. A control system for top and bottom hung sash including motor actuated operating means for each sash, and an electrical controlling circuit for the motors including switches actuated by said operating means to provide for causing the top sash to swing to an open position in advance of the opening movement of the bottom sash.

24. A control system for top and bottom hung sash including motor actuated operating means for each sash, and an electrical controlling circuit for the motors including switches actuated by said operating means to provide for causing the top sash to move to an open position in advance of the bottom sash and then to close.

25. A control system for top and bottom hung sash including motor actuated operating means for each sash, and an electrical controlling circuit for the motors including switches actuated by said operating means to provide for causing the top sash to move to an open position in advance of the opening of the bottom sash and then to automatically close.

26. A control system for top and bottom hung sash including motor actuated operating means for each sash, and an electrical controlling circuit for the motors including switches actuated by said operating means to provide for causing the top sash to move to an open position prior to either the opening or closing of the bottom sash.

27. A control system for top and bottom hung sash including motor actuated operating means for each sash, and an electrical controlling circuit for the motors including switches actuated by said operating means to provide for causing the top sash to move to a clearance position in advance of the opening of the bottom sash and then automatically to close, said controlling means also cooperating with the operating means to cause the top sash to open to a clearance position followed by the closing of the bottom sash and the closing of the top sash.

28. A control system for top and bottom hung sash including a motor driven operating rod for each sash, and electrical controlling circuits including a plurality of switches actuated by the movement of the operating rods and having contacts arranged to control the operation of the motors for both rods.

29. A control system for top and bottom hung sash including motor driven operating rods for each sash and electrical controlling circuits including switches respectively operated by the separate operating rods and having their contacts arranged to stop and also to reverse the motor.

30. A control system for top and bottom hung sash including motor driven operating rods for the separate sashes, and an electrical controlling circuit including a pair of control switches respectively actuated from the separate operating rods and having circuit connections with each other and with the two motors to provide for automatically stopping and reversing the motors in order.

31. A control system for top and bottom hung sash including motor driven operating rods for the sash and a pair of electrical control switches operated respectively by the separate operating rods and having circuit connections with each other and with both motors, said circuit connections being controlled by said switches to synchronize the operation of the motors and causing the independent movements of the sash.

32. A control system for top and bottom hung sash including motor driven operating rods, a pair of electrical control switches respectively actuated by the separate operating rods and having circuit connections with each other and with both motors, and a supplemental electrical control switch actuated by the the operating rod for the top sash and having circuit wire connections with the motor for the upper sash and with the upper of said main control switches.

33. A control system for top and bottom hung sash including motor driven operating rods for the two sash, a pair of main control switches actuated respectively by the separate operating rods and electrically connected with each other and with both motors to provide means for opening and closing one sash in advance of the other, and a supplemental control switch actuated by the operating rod for the top sash and having circuit connections with one of the main control switches and with the motor for the top sash to provide independent means for operating the top sash.

34. The combination with a lower sash hung to swing from its lower end, of an upper sash hung to swing from its upper end and having its lower free end overhanging the upper end of the lower sash, of mechanism for effecting the swinging of both sashes with the upper sash moving in advance of the lower sash until the lower end thereof is out of the path of movement of the upper end of the lower sash.

35. The combination with a lower sash hung to swing from its lower end, of an upper sash hung to swing from its upper end and having its lower free end overhanging the upper end of the lower sash, of mechanism for effecting the swinging of both sashes with the upper sash moving in advance of the lower sash until the lower end thereof is out of the path of movement of the upper end of the lower sash, said mechanism continuing the movement of the lower sash beyond the upper sash and on the closing movements of said sashes effecting a retrograde movement of the lower sash past the upper sash and its movement to closed position in advance of the upper sash.

36. A control system for swinging sash units including a motor, an operating rod actuated by the motor, tappets thereon, and an electrical control circuit for the motor including a control switch having a series of stationary contacts and a series of shiftable contacts, spring tensioned means for throwing the shiftable contacts into and out of engagement with the stationary contacts, and means engaged by said tappets for actuating said spring tensioned means.

37. A control system for swinging sash units including a motor, an operating rod actuated by the motor, tappets thereon, and an electrical control circuit for the motor including a control switch having a plurality of stationary contacts, a shiftable block carrying a plurality of movable contacts, means for shifting said block including a spring tensioned shaft and a throwing arm thereon, a tumbler yoke on the shaft, and a shifter bar having a cam for engaging with the tumbler yoke and adapted to be engaged by the tappets on the rod.

38. A control system for top and bottom hung sash including motor driven operating rods for the two sash, a pair of main control switches actuated respectively by the separate operating rods and having circuit wire connections with each other and with both motors, a supplemental control switch actuated from the operating rod for the top sash and included in the electrical circuit with one of said main control switches and with the motor for the top sash, a master hand switch included in the circuits for the main control switches and an auxiliary hand switch included in the circuit only for the supplemental control switch.

In testimony whereof I hereunto affix my signature in the presence of two witnesses.

HERBERT E. WHITE.

Witnesses:
R. T. TODD,
C. L. MAXWELL.